United States Patent
Yanagawa et al.

(10) Patent No.: US 7,211,333 B2
(45) Date of Patent: May 1, 2007

(54) RESIN FORMING MOLD AND PRODUCTION METHOD FOR THE RESIN FORMING MOLD

(75) Inventors: Yukihiro Yanagawa, Kashima-gun (JP); Takumi Yagi, Kashima-gun (JP); Masaru Karai, Kashima-gun (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 10/542,053

(22) PCT Filed: May 13, 2004

(86) PCT No.: PCT/JP2004/006437

§ 371 (c)(1),
(2), (4) Date: Jul. 12, 2005

(87) PCT Pub. No.: WO2004/101248

PCT Pub. Date: Nov. 25, 2004

(65) Prior Publication Data

US 2006/0057847 A1    Mar. 16, 2006

(30) Foreign Application Priority Data

May 13, 2003   (JP)   ............................ 2003-134965

(51) Int. Cl.
| | |
|---|---|
| B32B 15/04 | (2006.01) |
| B32B 15/20 | (2006.01) |
| C23C 16/00 | (2006.01) |
| C23F 1/00 | (2006.01) |
| C25D 1/10 | (2006.01) |

(52) U.S. Cl. .................. 428/650; 428/652; 428/610; 428/680; 428/336; 427/250; 205/70; 205/186; 216/41

(58) Field of Classification Search .............. 428/650, 428/651, 652, 653, 610, 687, 680, 215, 336; 427/250, 255.34; 205/70, 186; 216/41
See application file for complete search history.

(56) References Cited

U.S. PATENT DOCUMENTS 6,706,465 B1*   3/2004   Sano ........................ 430/320

FOREIGN PATENT DOCUMENTS

| JP | 07-003470 | 1/1995 |
|---|---|---|
| JP | 10-308040 | 11/1998 |
| JP | 11-039730 | 2/1999 |
| JP | 2003-025335 | 1/2003 |

* cited by examiner

Primary Examiner—Michael E. LaVilla
(74) Attorney, Agent, or Firm—Oblon, Spivak, McClelland, Maier & Neustadt, P.C.

(57) ABSTRACT

The present invention is to provide a resin-forming mold having high releasability and permitting a production without increasing production costs. The resin-forming mold can be used to produce a resin-molded product having minute uneven portions on a front face thereof, such as a surface light source device-use light guide for a liquid crystal display, an aspherical micro-lens, micro-Fresnel lens and an optical disk. In the stamper (resin-forming mold) 10 provided with an electroformed layer 11 and a conductive film 12 formed on the electroformed layer 11, the front face layer 12c of the conductive film 12 is formed of aluminum and a back face 12d is formed of nickel as an electroconductive metal. In addition, the constituent composition of the aluminum and the nickel continuously changes from the front face 12c toward the back face 12d. The front face 12c may be formed of aluminum and oxygen. The aluminum may combine with the oxygen to form an oxide of aluminum.

15 Claims, 9 Drawing Sheets

Pattern of B-type stamper

Pattern of C-type stamper

RESIN FORMING MOLD AND PRODUCTION METHOD FOR THE RESIN FORMING MOLD

The present application is a national stage application of International Application No. PCT/JP04/06437, filed on May 13, 2004, which published as WO 04/101248 on Nov. 25, 2004, and claims priority to Japanese Application No. 02/09727, filed on May 13, 2003, the entire contents of which are hereby incorporated by reference.

TECHNICAL FIELD

The present invention relates to a resin-forming mold for use in forming finely uneven portions on a surface of a molding resin as well as to a method for producing the same. Particularly, the invention is favorably used for the production of light guides for surface light source devices.

BACKGROUND ART

A stamper 1 as shown in FIG. 7 is formerly known for producing resin-molded products having finely uneven portions on their surfaces, for example, light guides for the surface light source devices of liquid crystal displays, aspheric micro-lenses, micro-Fresnel lenses, optical disks, etc.

This stamper 1 comprises a nickel-electroformed layer 1a and a metal electroconductive film 1b formed on the nickel-electroformed layer 1a.

In order to produce such a stamper 1, a master plate 2 is used, which comprises a glass substrate 2a and a photoresist film 2b formed on the glass substrate 2a and having a minute uneven pattern. That is, an electroconductive film 1b of nickel is formed on a surface of the master plate, and the nickel-electroformed film 1a is formed as a stamper body (resin-forming mold body) through electroforming by using the metal-electroconductive film 1b as a cathode.

Then, the stamper 1 (resin-forming mold) is produced by peeling the electroconductive film 1b and the nickel-electroformed layer 1a from the master plate 2, while an interface between the electroconductive film 1b and the photoresist film 2b is taken as a boundary.

The stamper 1 is used as a part of the resin-forming mold to form a finely uneven surface of a molding resin for an optical disc or the like. The resin-molded product is produced by injection molding the molding resin onto the stamper 1.

The stamper 1 has not necessarily good releasability (mold releasability) to the resin-molded product.

This is considered to largely depend upon a chemical property that a peeling face (surface) of the electroconductive film 1b formed mainly with nickel only has not high mold releasability.

For this reason, particularly when the molding resin is for the light guide of the surface light source device, the light guide has a large area and in addition a height difference in the uneven pattern, so that a contact surface area between the molding resin and the stamper 1 is large to further deteriorate the mold releasability.

Therefore, there occur troubles that the resin is not smoothly molded and/or the uneven pattern shape is not reversely transferred onto the molded product faithfully. Consequently, the productivity of the resin molded products decreases and the product cost increases.

Under the circumstances, a stamper 3 shown in FIG. 8 is devised to improve mold releasability between the stamper 1 and the resin-molded product (For example, see JP-A 10-308040).

This stamper 3 comprises a nickel-electroformed layer 3a and a metal-electroconductive film 3b as in the case of the stamper 1. The stamper 3 further has an oxidized film 3c formed on the metal-electroconductive film 3b, and a mold-releasing layer 3d formed of an organic fluorine compound on the oxidized film 3c.

As another example of this type, a stamper is devised, in which a mold-releasing layer is provided on a surface of a base material having an uneven pattern formed thereon (For example, see JP-A 11-039730).

In this stamper, the base material made of silicon is provided with the mold-releasing layer formed of at least one kind of metals selected from nickel (Ni), chromium (Cr), titanium (Ti), aluminum (Al), copper (Cu), gold (Au), silver (Ag) or platinum (Pt) or compounds thereof so as to improve mold releasability between the resin molded product and the mold.

However, the mold releasability of the stamper 3 can be improved with the mold-releasing layer 3d made of the organic fluorine compound, but the production of the stamper 3 requires a step in which the mold-releasing layer 3d made of the organic fluorine compound is further formed by vacuum deposition or the like after a stamper body is released from the master plate 2.

Therefore, the stamper 3 has the problem that the number of producing steps increases to raise the production cost.

On the other hand, the stamper described in JP-A 11-039730 mainly assumes the base material made of silicon. It is feared that a base material made of the metal renders peeling between the base material and the mold-releasing layer easy.

DISCLOSURE OF THE INVENTION

The present invention has been accomplished to solve the above-mentioned problems, and is mainly aimed at providing a resin-forming mold which exhibits high mold releasability to a molding resin and excellent durability and permits the production without increasing a producing cost. The invention is also to provide a method for producing such a resin-forming mold.

In order to solve the above problems, the resin-forming mold according to the present invention comprises an electroconductive film having uneven portions formed on a front face thereof and made of an electroconductive metal, and an electroformed layer formed on a back face of the electroconductive film by electroforming, said electroconductive film having the front face substantially formed of aluminum and the back face formed of an electroconductive metal, wherein a compounding ratio between said aluminum and said electroconductive metal continuously changes from the front face toward the back face and in case that a resin is molded with use of the resin-forming mold, a surface layer of the electroconductive film is not peeled when the resin molded body is released from the mold after the resin is molded.

Since the thus constructed resin-forming mold according to the present invention has the front face made of aluminum easily peelable from the molding resin, the mold exhibits high mold releasability.

In addition, since the constituent composition between the aluminum and the electroconductive metal continuously varies from the front face toward the back face, the aluminum forming that front face hardly peels from the electroconductive film.

The electroconductive metal is selected from the standpoint of view that the electroconductive metal is firmly held by the electroformed layer and the constituent compounding ratio between the aluminum and the electroconductive metal can be continuously changed from the front face toward the back face of the electroconductive film. Such an electroconductive metal may be any of nickel, gold, silver and copper, or any alloy of two or more kinds of gold, silver, copper and nickel. The electroconductive film may be formed by any of vacuum deposition, sputtering, electroless nickel plating and the like. "The front face of the electroconductive film is substantially formed of aluminum" means that the front face may contain oxygen and inevitable impurities so long as the mold can excellently maintain the properties required for the mold, such as mold releasability.

Further, as the metal forming the electroformed layer, an appropriate metal is selected from the standpoint of view that the electroconductive metal can be firmly held to the back face of the electroconductive film through electroforming and can form the electroformed layer functioning as an excellent mold body. As the metal for forming the electroformed layer, any of nickel, copper or zinc may be used. In addition, an alloy of any two or more of copper, zinc and nickel may be used.

Further, as the molding resin to be molded with the resin-forming mold according to the present invention, mention may be made of acrylonitrile-butadiene-styrene copolymer, methacrylic resin, polycarbonate resin, polystyrene, rubber-reinforced polystyrene, styrene-methylmethacrylate copolymer resin, styrene-butadiene copolymer resin, polyethylene, polypropyrene, amorphous polyolefin resin, nylon 6, nylon 66, modified polyphenylene ether, etc.

Regarding the electroconductive film, "the front face is substantially formed of aluminum, the back face is formed of the electroconductive metal, and the constituent compounding ratio between the aluminum and the electroconductive metal continuously varies" means as follows.

That is, with respect to any imaginary sectional face of the electroconductive film from the front face toward the back face of the electroconductive film, there is present no boundary face, which clearly discriminates the opposite sides of the imaginary sectional face, between the front face formed of the aluminum and the back face substantially formed of the electroconductive metal. In general, there is a tendency that the content of aluminum in the electroconductive film decreases from the front face toward the back face, whereas there is a tendency that the content of the electroconductive metal in the electroconductive film decreases from the back face toward the front face. "Continuously" does not necessarily mean "monotonously decreases or increases" only. That is, decrease or increase in the form of slight up-and-down zigzag is allowed so long as the surface layer of the electroconductive film does not peel when the resin molded product is released from the mold, after molding, in the case of forming the resin with use of the resin-forming mold. The minimum requirement is that the front face of the electroconductive film is substantially made of aluminum to afford sufficient mold releasability upon the molding resin, the back face of the electroconductive film is suitable for the formation of the electroformed layer and is made of the electroconductive metal so that the back face may be firmly held upon the electroformed layer, and the intermediate layer is continuously integrated with the front face layer and the back face layer without being peeled therefrom.

Another aspect of the present invention provides a resin-forming mold comprising an electroconductive film having uneven portions formed on a front face thereof and made of an electroconductive metal, and an electroformed layer formed on a back face of the electroconductive film by electroforming, said electroconductive film having the front face substantially formed of aluminum and oxygen and the back face formed of an electroconductive metal, wherein a compounding ratio between said aluminum and said electroconductive metal continuously changes from the front face toward the back face and in case that a resin is molded with use of the resin-forming mold, a surface layer of the electroconductive film is not peeled when the resin molded body is released from the mold after the molding.

Since the thus constructed resin-forming mold has the front face made of aluminum and oxygen easy to be peeled from the molding resin, it exhibits good mold releasability.

In addition, since the constituent composition between the above aluminum and the electroconductive metal continuously varies from the front face toward the back face in the thus constructed resin-forming mold, the above aluminum which constitutes the above front face together with oxygen is hardly separated from the above electroconductive film.

SUMMARY OF THE INVENTION

In the following, mention will be made of preferred embodiments of the present invention. Any combinations of them are preferred embodiments of the resin-forming mold according to the present invention, if no contradiction occurs.

(1) The above electroconductive film is made of a material composed of aluminum and the electroconductive metal at a weight compounding ratio of 70:30 to 10:90. By this, good releasability is obtained in forming the resin.

(2) The electroconductive film is formed by vapor deposition. By this, the electroconductive film having uniform film formation can be obtained.

(3) The thickness of the electroconductive film is 200 to 3000 Å. This is a thickness suitable for forming the electroconductive film by vapor deposition, sputtering, electroless nickel plating or the like.

(4) The compounding ratio between the above aluminum and the above electroconductive metal is 97.5:2.5 to 10:90 in a depth range of 10 to 100 Å from the front face of the electroconductive film. By this, good mold releasability can be obtained in forming the resin, and the electroconductive film can be prevented from being peeled from the resin-forming mold.

(5) When the depth is not less than 110 Å from the front face of the above electroconductive film, the constituting proportion of the above aluminum monotonously decreases. This affords good mold releasability and prevents the electroconductive film from peeling in the resin-forming mold, when the resin is formed.

(6) At least a part of the above aluminum reacts with the above oxygen to form an oxide of aluminum.

Since the front face of the thus constructed resin-forming mold contains the oxide of aluminum exhibiting easy peeling from the molding resin, the mold has high mold releasability.

(7) The electroconductive metal is nickel.

Since the electroconductive metal of the thus constructed resin-forming mold is nickel, the constituent composition between the electroconductive metal and the above aluminum can be easily continuously changed, and the electroconductive film being dense and free from defects can be obtained.

(8) The electroformed layer is a nickel-electroformed layer formed of nickel.

Since the electroformed layer is formed of nickel, the thus constructed resin-forming mold has high hardness and excellent durability.

Further, the present invention provides a method for producing a resin-forming mold, comprising: fitting aluminum to a heating heat generator inside a vacuum deposition apparatus, leaving a predetermined amount of the aluminum on the heat generator by evaporating the aluminum, fitting a master plate comprising a substrate and a photoresist film on the substrate to a substrate holder inside said vacuum deposition apparatus, said photoresist film being adapted to form a predetermined uneven pattern and fitting an electroconductive metal on said heating heat generator; forming an electroconductive film on the photoresist film of the master plate by vacuum depositing the left aluminum and the electroconductive metal; forming an electroformed layer on the electroconductive film by electroforming an electroforming metal; and obtaining the resin-forming mold by removing the master plate from the electroconductive film.

In the thus constructed resin-forming mold production method according to the present invention, when the above electroconductive metal is vapor deposited on the photoresist film of the master plate, the remaining aluminum first begins to be vapor deposited, and then the electroconductive metal is vapor deposited.

Accordingly, the front face of the electroconductive film affording a contact face between the photoresist film is formed of aluminum.

Further, when the aluminum remains and oxygen is contacted with a heat generator heated at a high temperature, the above front face of the electroconductive film is formed of aluminum and oxygen or contains the oxide of aluminum.

In addition, the resin-forming mold is provided with the electroconductive film in which the constituent composition between the aluminum and the electroconductive metal continuously varies from the front face toward the back face.

Therefore, the resin-forming mold production method can easily produce the above-mentioned resin-forming mold of the present invention. Preferred embodiments of the resin-forming mold production method of the present invention will be explained below. Unless there is a particular contradiction, any combinations of them are preferred embodiments of the resin-forming mold production method of the present invention.

(1) The weight constituent composition of the remaining aluminum and the fitted electroconductive metal meets 90:10 to 10:90.

(2) The thickness of the electroconductive film is 200 to 3000 Å.

(3) The above electroconductive metal is nickel.

Since the electroconductive metal is nickel in the thus constructed resin-forming mold production method, the constituent composition of aluminum and the electroconductive metal can be easily continuously changed, and the electroconductive film being dense and free from defects can be obtained.

(4) The electroforming metal is nickel.

Since the electroformed layer is formed of nickel in the thus constructed resin-forming mold production method, the mold having high hardness and excellent durability can be produced.

BEST MODES FOR CARRYING OUT THE INVENTION

Embodiments of the present invention will be explained with reference to the drawings.

Figure 1:
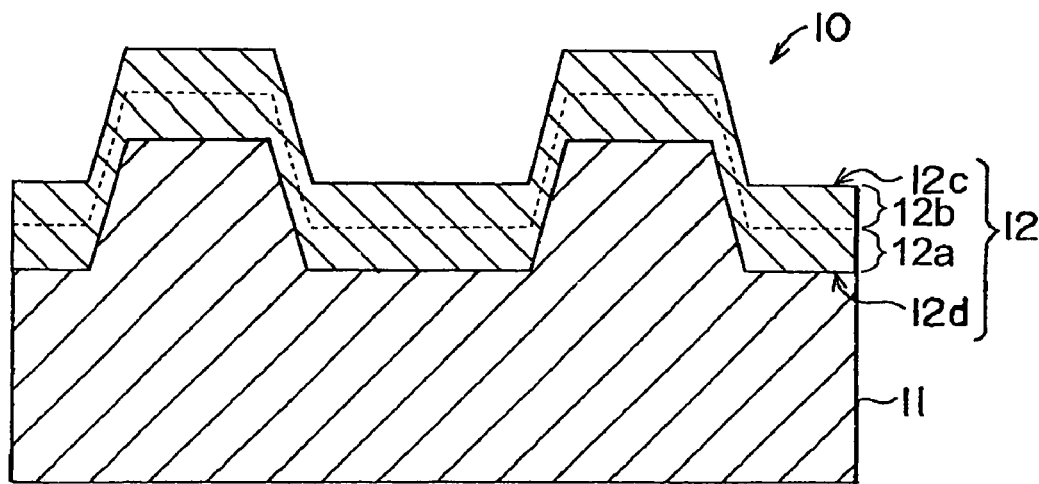
FIG. 1 is a schematically sectional view of a part of a resin-forming mold according to the present invention.

As shown in FIG. 1, a resin-forming mold 10 of this embodiment comprises an electroconductive film 12 having uneven portions at a front face 12c and a nickel electroformed layer 11 formed on a back face 12d of the electroconductive film 12.

The uneven portions of the front face 12c of the electroconductive film 12 are minute. The front face 12c is formed of aluminum (Al) or aluminum and oxygen (O) which may contain inevitable impurities (carbon (C), etc.).

Figure 2:
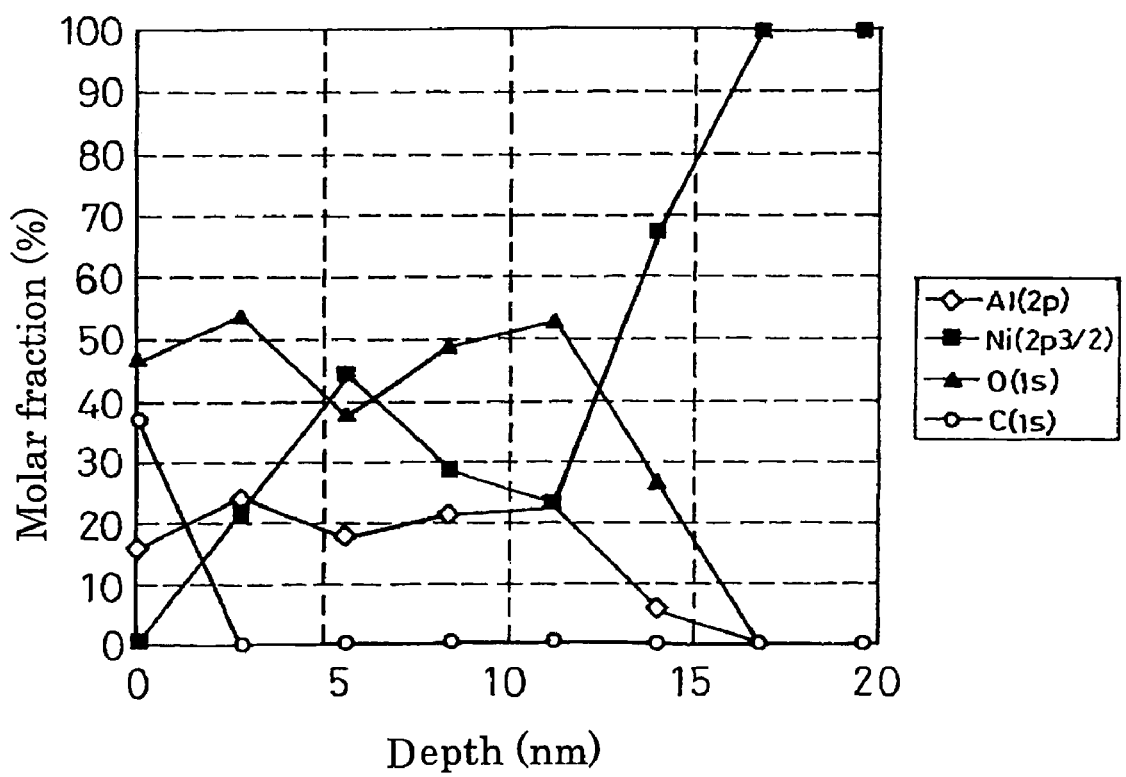
FIG. 2 is a graph showing analysis results of constituent composition obtained with an X-ray electron spectroscopic instrument for chemical analysis by using a stamper 10K produced in Example 1.

That is, when the resin-forming mold 10 is analyzed with the X-ray electron spectroscopic instrument (electron spectroscopy for chemical analysis) from a side of the front face 12c, the mold has the constituent composition of aluminum, oxygen and carbon only detected at a detection-starting point (the point at a depth of 0 nm) as shown in FIG. 2.

Therefore, the front face 12c of the resin-forming mold 10 does not contain nickel (Ni) or contains such a minute amount of nickel as not detectable with the X ray electron spectroscopic instrument.

The resin-forming mold 10 having such a front face 12c has high mold releasability to the resin to be molded (e.g., acrylic resin).

This is considered that aluminum or aluminum and oxygen have chemical properties which realize easy release of the molded resin adhered to the front face 12c.

Further, the resin-forming mold 10 has such a so-called inclined composition that the back face 12d is formed of nickel as the electroconductive metal, and the constituent composition of the above aluminum and the above nickel continuously changes from the front face 12c toward the back face 12d.

That is, in the present embodiment, the electroconductive film 12 comprises the inclined composition layer 12b containing aluminum and nickel and the nickel layer 12a formed of nickel.

FIG. 1 schematically clearly shows the inclined composition layer 12b and the nickel layer 12a. However, since the constituent composition of the above aluminum and the above nickel continuously changes in the electroconductive film 12 from the front face 12c toward the back face 12d, no clear boundary face exists between the inclined composition layer 12b and the nickel layer 12a. That is, "continuously changes" does not necessarily mean "monotonous change" only.

When the electroconductive film 12 has the inclined composition that the constituent component of the aluminum and the nickel continuously changes from the front face 12c toward the nickel layer 12a, no clear boundary face is formed between the aluminum forming the front face 12c and the nickel layer 12a. Consequently, the aluminum is hardly peeled from the boundary face.

Therefore, the resin-forming mold 10 according to this embodiment, which has the front face 12c formed containing aluminum, exhibits high mold releasability to the molding resin, and high durability because the aluminum forming the front face 12c is hardly peeled from the resin-forming mold 10.

Further, when the above electroconductive metal is nickel as in the resin-forming mold 10 of the present embodiment, the inclined composition can be easily realized by continuously changing the constituent composition of nickel and aluminum.

In addition, when the electroconductive metal is nickel, the electroconductive film 12 can be easily made dense with fewer defects.

The nickel-electroformed layer II is provided to mainly ensure the strength through being thickened, and is formed (film-formed) by electroforming nickel on the back face 12d of the electroconductive film 12.

When the nickel-electroformed layer 11 is produced by forming the electroformed layer of the resin-forming mold 10 with nickel in this way, the resin-forming mold having high hardness and excellent durability can be obtained.

Further, since the electroconductive film 12 is formed of nickel in the resin-forming mold 10 of the present embodiment, the nickel-electroformed layer 11, which is made of the same metal as that of the electroconductive film 12, can be integrated with the film 12.

In the resin-forming mold 10 of the present embodiment, the front face 12c is formed of aluminum, oxygen and inevitable impurities. At least part of the above aluminum may form an oxide of aluminum (AlxOy, x and y being not limited to integers) through reaction with the above oxygen.

Since the above front face 12c is formed, containing the oxide of aluminum which easily permits peeling from the molding resin, the resin-forming mold has high mold releasability.

Further, the oxide of aluminum may be aluminum oxide ($Al_2O_3$). Even in this case, since the above front face is formed, containing aluminum oxide which permits peeling from the molding resin, the resin-forming mold has high mold releasability.

Further, although the electroconductive metal is nickel in the resin-forming mold 10 of the present embodiment, the electroconductive metal of this mold is not necessarily limited to nickel. For example, the electroconductive metal may be any of gold, silver and copper, or an alloy of any two or more of gold, silver, copper and nickel.

Furthermore, a method for forming the electroconductive film 12 is not limited. Any method may be employed so long as the electroconductive film 12 is so formed that the front face 12c is formed of aluminum or aluminum and oxygen, the back face 12d is formed of nickel and the constituent composition between the above aluminum and the above nickel continuously varies from the front face 12c toward the back face 12d.

For example, the electroconductive film 12 may be one formed by any method, including vacuum deposition, sputtering, or electroless nickel plating.

The electroformed layer of the resin-forming mold 10 is formed of nickel, but the electroformed layer of the mold according to the present invention is not necessarily limited to the nickel-electroformed layer 11. For example, the electroformed layer may be one formed of either copper or zinc, or any alloy of two or more of copper, zinc and nickel.

As the molding resin to be molded with the resin-forming mold 10, mention may be made of acrylonitrile-butadiene-styrene copolymer, methacrylic resin, polycarbonate resin, polystyrene, rubber-reinforced polystyrene, styrene-methylmethacrylate copolymer, styrene-butadiene copolymer, polyethylene, polypropylene, amorphous polyolefin resin, nylon 6, nylon 66, modified polyphenylene ether, etc.

Next, a preferred method for producing the resin-forming mold 10 having such a construction will be explained.

Figure 3:
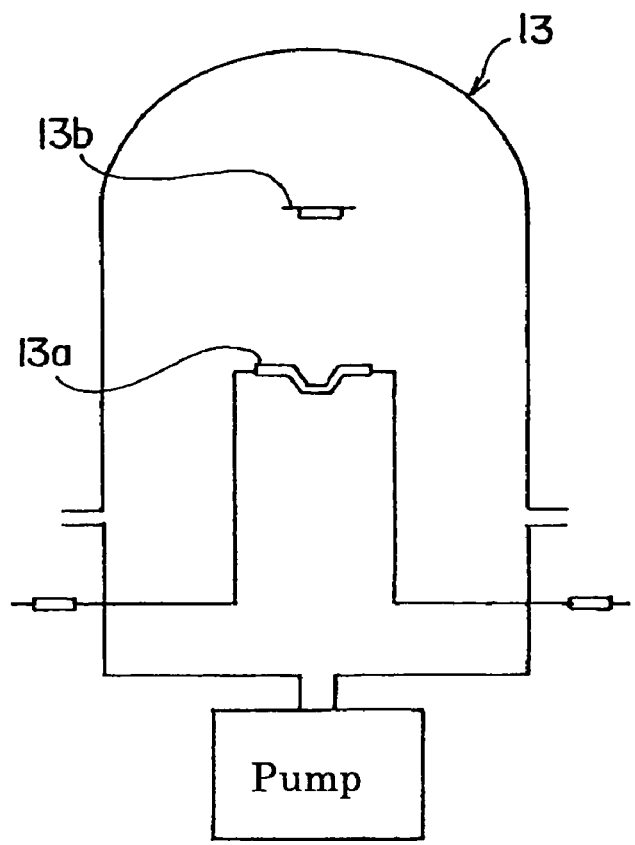
FIG. 3 is a schematic view of a vacuum deposition apparatus to be used for the production of the resin-forming mold according to the present invention.

First, as shown in FIG. 3, aluminum is fitted to a tungsten basket 13a as a heating heat generator inside a vacuum deposition apparatus 13.

On the other hand, a dummy substrate is fitted to a substrate holder 13b arranged at a predetermined position inside the vacuum deposition apparatus 13. The dummy substrate is used, as a vapor depositing plate on which a substantial amount of the above aluminum is vapor deposited, so that a minute amount of the aluminum may be retained in the tungsten basket 13a.

Aluminum is vapor deposited on the dummy substrate through evaporation of the above aluminum by heating the tungsten basket 13a.

By so doing, a minute amount of the aluminum is left in the tungsten basket 13a. The aluminum is retained in such an appropriate amount that the function of the present invention may be exhibited and that at least a front face of a master plate 14 may be sufficiently covered with aluminum. The amount may be appropriately determined depending upon the size of the master plate 14, that of the vacuum deposition apparatus and so on.

Then, the dummy substrate is removed from the substrate holder 13b, and the master plate 14 is fitted to the substrate holder 13b.

Figure 4:
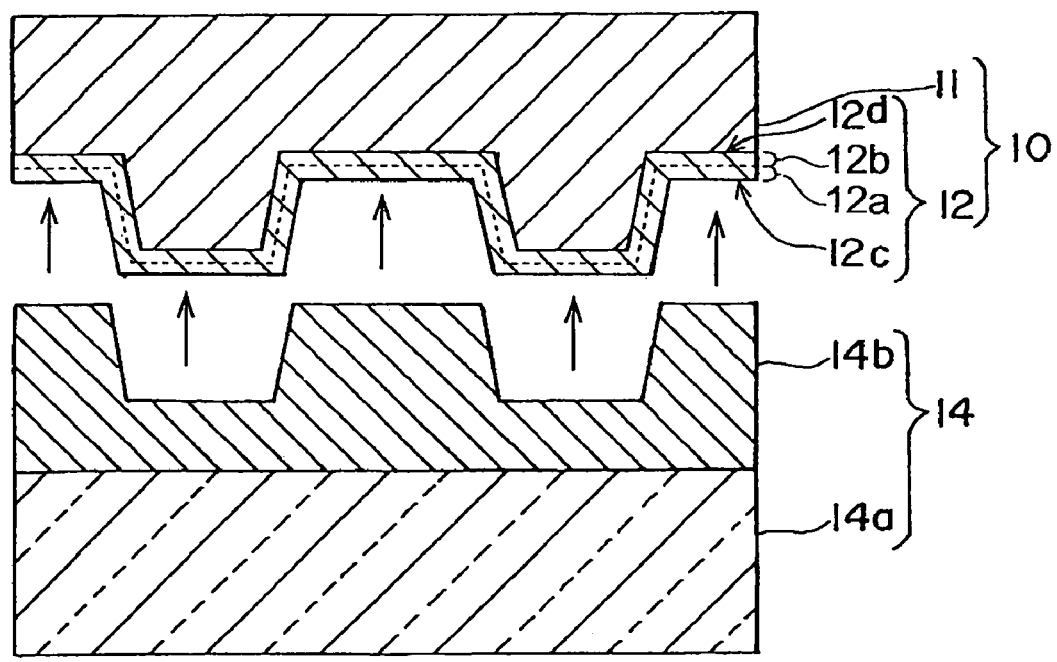
FIG. 4 is a partially schematically sectional view of a part of the resin-forming mold according to the present invention and a master plate to be used for the production of the resin-forming mold.

As shown in FIG. 4, the master plate 14 has a glass substrate 14a as a substrate and a photoresist film 14b, on the glass substrate 14a, for forming a given uneven pattern. FIG. 4 shows the master plate 14 and a stamper 10 obtained by using the master plate. As described later, the stamper 10 is produced by forming an electroconductive film on the photoresist film of the master plate, obtaining a composite body by electroforming with use of the electroconductive film-formed master plate, and removing the master plate from the composite body.

Further, nickel is placed as the electroconductive metal into the tungsten basket 13a where a minute amount of aluminum remains as mentioned above.

Then, an electroconductive film 12b is formed on the photoresist film 14b of the master plate 14 through vapor deposition of the remaining aluminum and nickel by heating the tungsten basket 13a.

In the electroconductive film 12b thus formed by the above step, the front face 12c as a contact face between the photoresist film 14b is formed of aluminum (and oxygen), whereas the back face 12d is formed of nickel. In addition, the constituent composition of the above aluminum and the nickel continuously changes in the electroconductive film 12 as the location goes from the front face 12c toward the back face 12d.

This is because aluminum having a lower boiling point than that of nickel begins to be evaporated during a temperature-rising step of the tungsten basket 13a. Then, nickel begins to be evaporated together with the evaporation of aluminum, so that the evaporated amount of nickel gradually increases. It is considered that after lapse of a given time period, the above minute amount of aluminum is all evaporated, and thereafter only nickel is evaporated.

The inclined composition layer 12b thus formed may contain oxygen. This is considered to be that when the atmosphere is returned to the original pressure with air after the vapor deposition, and the minute amount of aluminum remaining in the tungsten basket 13a is at a high temperature, so that the aluminum is oxidized to oxide of aluminum through oxidization with oxygen in air (through contacting with oxygen in air) before the master plate 14 and the electroconductive metal (nickel) are fitted at the predetermined positions, respectively and the oxide of aluminum is also vapor deposited during the vapor deposition of the nickel on the photoresist film 14b.

Therefore, according to the method for producing the resin-forming mold in the present embodiment, the inclined composition layer 12b in which the constituent composition between the above aluminum and the above nickel continuously varies can be easily formed on the electroconductive film 12 merely by vapor depositing nickel with the tungsten basket 13a in which the minute amount of aluminum remains.

Then, the master plate on which the electroconductive film is formed is taken out from the vacuum deposition apparatus, and placed into an electroforming device where a nickel-electroformed layer 11 is formed on the electroconductive film 12 by electroforming nickel as an electroforming metal with the electroconductive film 12 being taken as a cathode. Then, a resin-forming mold 10 is obtained by peeling the electroformed layer and the electroconductive film 12 from the master plate 14.

When the nickel-electroformed layer 11 is formed on the electroconductive film 12 made of nickel in this way, the nickel-electroformed layer II is integrated with the electroconductive film 12 since the nickel-electroformed layer 11 is formed of the same metal as that of the electroconductive film 12. Therefore, a so-called father obtained by peeling the master plate 14 can be used directly as the resin-forming mold 10.

As mentioned above, in the resin-forming mold 10 produced by the resin-forming mold production method of the present embodiment, the front face 12c of the electroconductive film 12 is formed containing aluminum, whereas the back face 12d is formed of nickel.

Further, according to the resin-forming mold 10, the constituent composition of the above aluminum and the above nickel continuously varies from the front face 12c toward the back face 12d in the electroconductive film 12.

Furthermore, according to this production method, the inclined composition in which the constituent composition of the aluminum and the nickel continuously varies can be easily formed for the electroconductive film 12 merely by fitting nickel in the tungsten basket 13a in which the minute amount of aluminum remains and performing the vapor deposition.

EXAMPLES

Examples implemented for the present invention will be explained below. Explanation will be made, while the same reference numerals are given to the same or similar parts as shown in FIGS. 1 and 3 to 7.

Example 1

(A) Production of a resin-forming mold according to the present invention

A stamper as the resin-forming mold according to the present invention was produced by the following process.

The stamper in this Example is used to produce of a light guide for a surface light source device.

(1) Aluminum was set (fitted) into a tungsten basket 13a of a vacuum deposition apparatus 13 having the same construction as in FIG. 3, and a glass plate was set as a dummy substrate at the substrate holder 13b.

(2) The aluminum was vacuum deposited on the glass plate through evaporation by heating the tungsten basket 13a.

(3) In the atmosphere returned to the atmospheric pressure with air and containing oxygen, the glass plate was removed, and a master plate K corresponding to that 14 was set at the substrate holder 13b in FIG. 4.

Then, nickel as the electroconductive metal was set at the tungsten basket 13a.

Figure 5A:
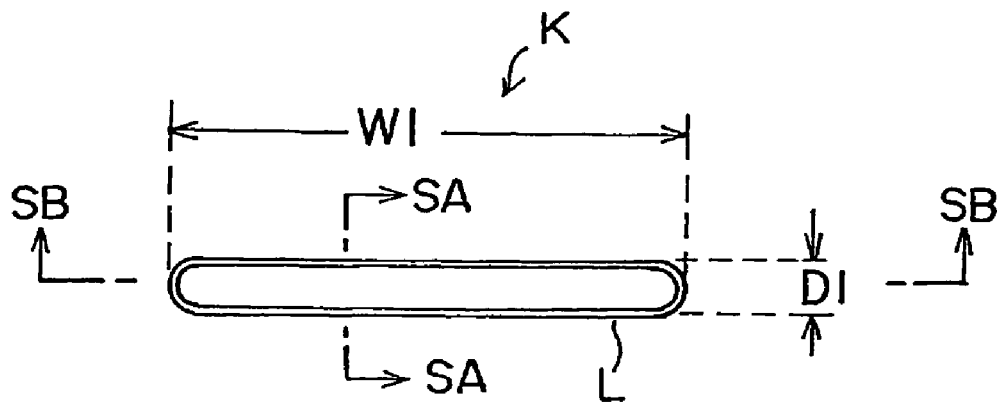
FIGS. 5(a) to 5(c) are figures showing a pattern of the stamper 10K of Example 1 of the present invention, FIG. 5(a) being a plane view of a depression, FIG. 5(b) being an SA—SA sectional view of FIG. 5(a), and FIG. 5(c) being an SB—SB sectional view of FIG. 5(a).
Figure 5B:
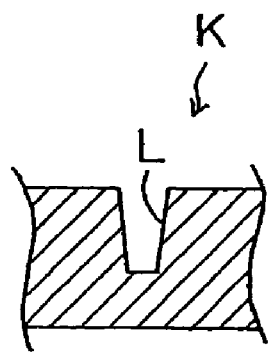
Figure 5C:
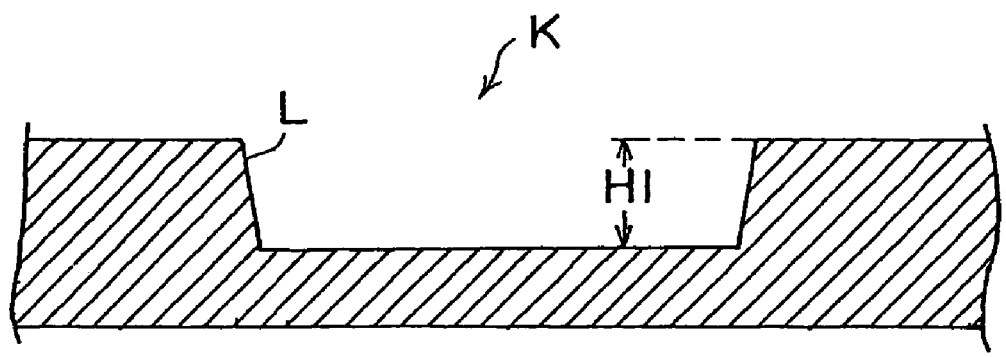

As shown in FIGS. 5(a) to 5(c), the master plate K is a master plate having a pattern which forms a plurality of fine depressions L on a front face of a stamper produced therefrom.

The depression L formed by this master plate K has a width W1=190 μm, a length D1=20 μm and a depth H1=8 μm, and has a sectionally almost trapezoidal section decreasing in width toward the depth direction.

(4) An electroconductive film 12 was formed on the photoresist film 14b of the master plate K by vapor depositing the above nickel on the master plate K.

(5) A nickel-electroformed layer 11 was formed by electroforming nickel as an electroforming metal on the electroconductive film 12 in a nickel sulfamate bath with the electroconductive film 12 being used as a cathode.

(6) The master plate K was peeled from the electroconductive film 12, the remainder was subjected to ordinary steps such as a resist-removing step, an outer shape-working step, a backpolishing step, etc. Thereby, the stamper 10K (Example 1-1) was obtained.

(7) A master plate S was used instead of the used master plate K, and a stamper 10S (Example 1-2) was obtained by similar steps (A) (1) to (6).

Figure 6A:
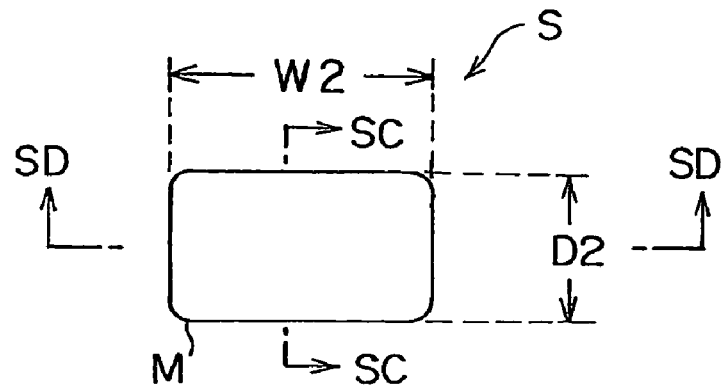
FIGS. 6(a) to 6(c) are figures showing a pattern of the stamper 10S in Example 1 of the present invention, FIG. 6(a) being a plane view, FIG. 6(b) being an SC—SC sectional view and FIG. 6(c) being an SD—SD sectional view.
Figure 6B:
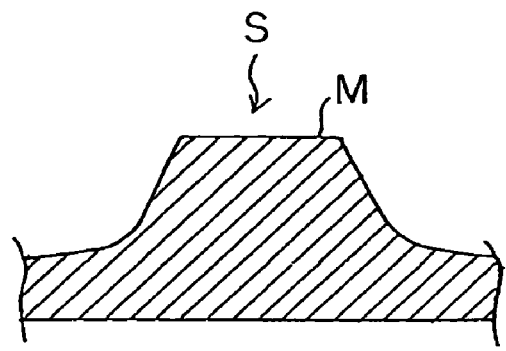
Figure 6C:
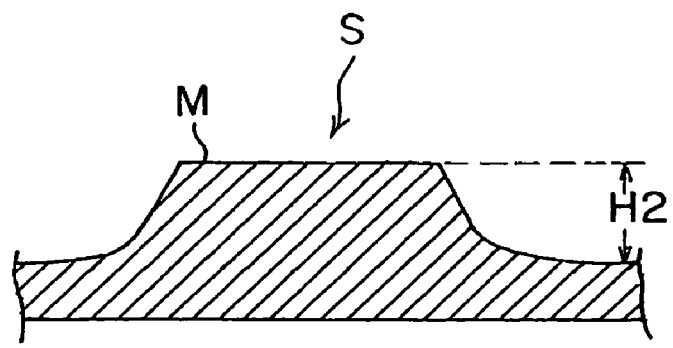

As shown in FIGS. 6(a) to 6(c), the master plate S is a master plate having a pattern which forms a plurality of fine projections M on a surface of a stamper formed thereby.

This projection M has a width W2=100 µm, a length D2=70 µm and a depth H2=8 µm, and exhibits an almost trapezoidal sectional shape which gradually decreases in width and has a base portion curved in a curved fashion.

Comparative Example 1

(B) Production of a conventional resin-forming mold

A conventional stamper was produced as Comparative Example 1 as shown below.

Figure 7:
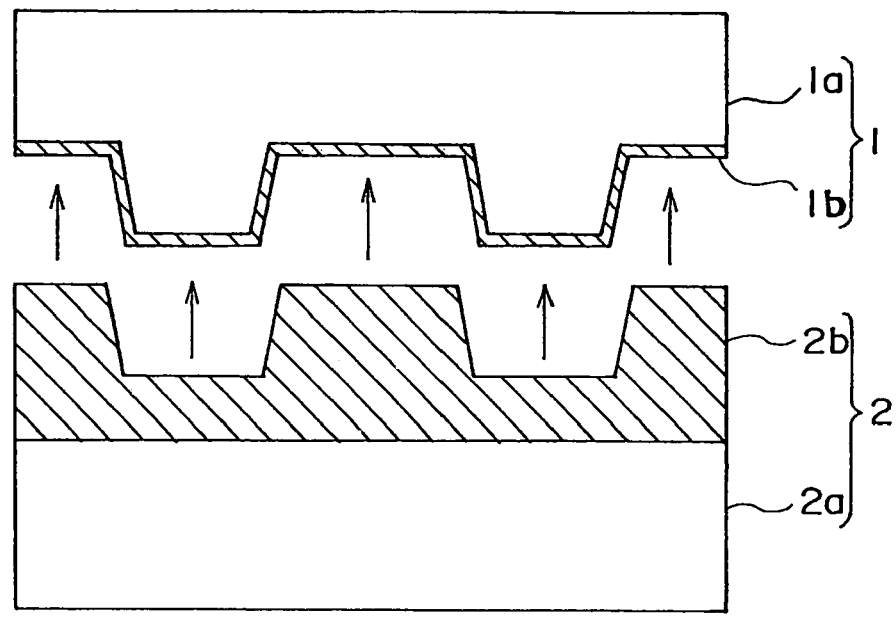
FIG. 7 is a schematically sectional view of a part of the conventional resin-forming mold.
Figure 8:
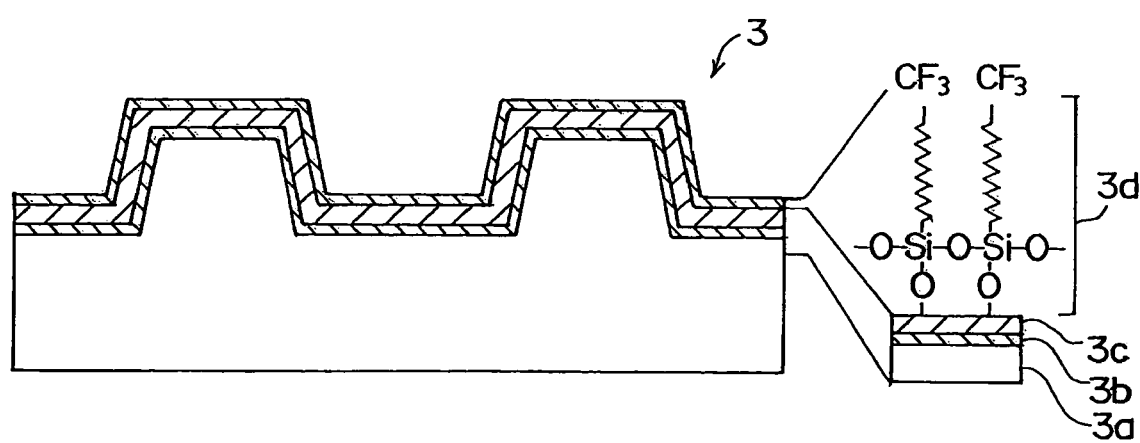
FIG. 8 is a schematically sectional view of a part of another conventional resin-forming mold.

(1) Nickel as the electroconductive metal was set in a tungsten basket 13a of a vacuum deposition apparatus 13 having the same construction as in FIG. 3, and a master plate K corresponding to that 2 was set at the substrate holder 13b in FIG. 7.

(2) An electroconductive film 1b was formed on the photoresist film 2b of the master plate K by vapor depositing the above nickel on the master plate K.

(3) A nickel-electroformed layer 1a was formed by electroforming nickel as the electroforming metal on the electroconductive film 1b according to the ordinary method with the electroconductive film 1b being used as the cathode.

(4) The master plate K was peeled from the electroconductive film 1b, and the remainder was subjected to ordinary steps such as a resist-removing step, an outer shape-working step, a backpolishing step, etc. Thereby, a stamper 1K (Comparative Example 1-1) was obtained.

(5) A master plate S was used instead of the master plate K, and a stamper 1S (Comparative Example 1-2) was obtained by the same steps as in (B) (1) to (4).

(C) Component analysis of the resin-forming mold

The thus obtained stamper 10K was analyzed under the following condition by using an X-ray electron spectroscopic instrument for chemical analysis, and results thereof are shown in FIG. 2.

According to the analysis results, as shown by a plot at a depth of 0 nm, the front face 12c of the electroconductive film 12 of the stamper 10K is formed with aluminum, oxygen and inevitable impurities (carbon), but does not contain nickel.

Then, the constituent composition of aluminum and nickel in the electroconductive film 12 continuously varies down to a depth of about 17 nm from the front face 12c toward the back face 12d.

Judging from the molar ratios of aluminum and oxygen and its chemical stability, it is considered that at least a part of aluminum constitutes aluminum oxide ($Al_2O_3$).

Further, the electroconductive film 12 is formed of nickel in an area from the depth of about 17 nm to the back face 12d.

For this reason, it is considered that the nickel layer 12a formed of nickel in the electroconductive film 12 functions mainly as the cathode in forming the nickel electroformed layer.

(D) Mold releasability test for the resin-forming molds

With respect to the stampers 10K and 10S according to the present invention and the conventional stampers 1K and 1S, mold releasability tests were carried out.

In the mold releasability test, polymethyl methacrylate (PMMA) as a molding resin was molded by injection molding.

(1) Relationship between the cooling time period and the mold releasability in releasing the molded product from the mold With respect to each of the stampers 10K, 10S, 1K and 1S, the relationship between the cooling time period and the mold releasability was examined by changing the cooling time period up to the time when the molded product was released from the mold. The mold releasability was judged by visually confirming whether a mold-released mark (chipping of corner portions of uneven portions) of a light guide for a surface light source device was present or not. Results were shown in Table 1 in which x and o denote molded products having mold-released marks and those having no mold-released marks, respectively.

TABLE 1

|  | 10 sec. | 15 sec. | 20 sec. | 25 sec. | 30 sec. | 35 sec. |
| --- | --- | --- | --- | --- | --- | --- |
| Example 1-1 (Stamper 0K) | X | O | O | O | O | O |
| Example 1-2 (Stamper 1K) | X | X | X | X | O | O |
| Comparative Example 1-1 (Stamper 10S) | X | X | X | O | O | O |
| Comparative Example 1-2 (Stamper 1S) | X | X | X | X | X | O |

As shown in Table 1, when the light guide for the surface light source device which was produced by the stamper 10K was cooled for 15 seconds or more, no mold-released mark was produced thereon. On the other hand, unless cooling was carried out for 30 sec. or more, a mold-released mark was produced on the light guide for the surface light source device which was produced by the conventional stamper 1K having the uneven portions having the same shape as that of the stamper 10K.

With respect to the light guide for the surface light source device produced by the stamper 10S, when cooling was carried out for 25 seconds or more, no mold-released mark was produced. On the other hand, unless cooling was carried out for 35 sec. or more, a mold-released mark was produced on the light guide for the surface light source device which was produced by the conventional stamper 1S having the uneven portions having the same shape as that of the stamper 10S.

That is, as compared with the conventional stampers 1K and 1S, the stampers 10K and 10S according to the present invention exhibit higher mold releasability, and can shorten the cooling time period.

This is considered to be that aluminum (or oxide of aluminum) at the front face 12c of each of the stampers 10K and 10S has a chemical property permitting easier peeling from the molding resin as compared with nickel.

The productivity of the light guides for the surface light source device can be enhanced by the stampers 10K and 10S which can shorten the cooling time period.

(2) Relationship between the holding pressure and the mold releasability

With respect to the stampers 10K and 1K, the relationship between the holding pressure and the mold releasability was examined by varying the magnitude of the holding pressure applied to the molding resin on injection molding. The mold releasability was judged by visually confirming whether a mold-released mark of a light guide for a surface light source device was present or not. Results were shown in Table 2 in which x and o denote molded products having mold-released marks and those having no mold-released marks, respectively.

TABLE 2

|  | 5 MPa | 10 MPa | 20 MPa | 30 MPa | 35 MPa | 40 MPa |
|---|---|---|---|---|---|---|
| Stamper 10K | ○ | ○ | ○ | ○ | ○ | ○ |
| Stamper 1K | ○ | ○ | ○ | ○ | X | X |

As shown in Table 2, when a light guide for the surface light source device was produced by using the stamper 10K, no mold-released mark was produced even in case that the molded product was held at a pressure of 40 MPa. To the contrary, when the molded product was held at a pressure of 35 MPa or more in the case of the conventional stamper 1K having the uneven portions with the shape as that of the stamper 10K, a mold-released mark was produced on the light guide for the surface light source device.

That is, as compared with the conventional stamper 1K, the stamper 10K according to the present invention has higher mold releasability, and hardly produces a mold-released mark even if the light guide for the surface light source device is molded at a higher holding pressure.

This is considered to be that aluminum (or oxide of aluminum) at the front face 12c of each of the stampers 10K and 10S has a chemical property permitting easier peeling from the molding resin as compared with nickel.

(Examples 2 to 7)

1. Production of stampers

Figure 9A:
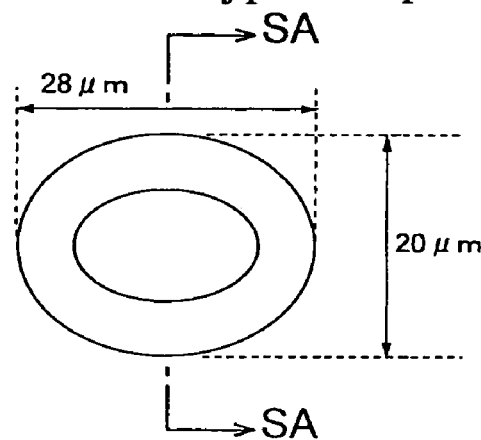
FIGS. 9(a) and 9(b) show the structure of a master plate used in Examples 2 to 7 of the present invention, FIG. 9(a) being a plane view of a projection and FIG. 9(b) being a SA—SA sectional view of FIG. 9(a).
Figure 9B:
Figure 10A:
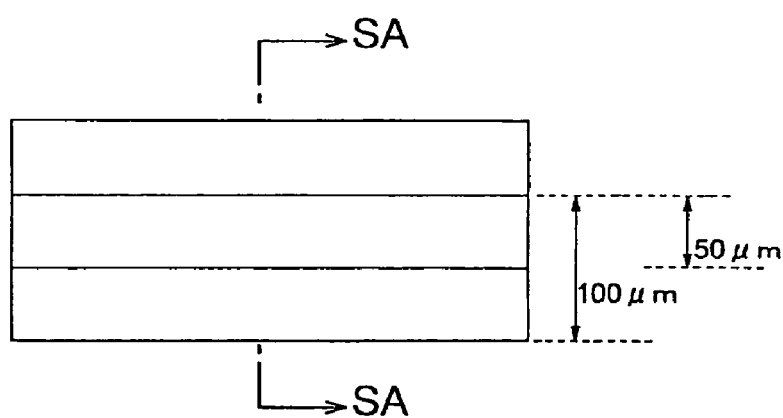
FIGS. 10(a) and 10(b) show the structure of another master plate used in Examples 2 to 7 of the present invention, FIG. 10(a) being a plane view of a projection and FIG. 10(b) being a SA—SA sectional view of FIG. 10(a).
Figure 10B:
Figure 11A:
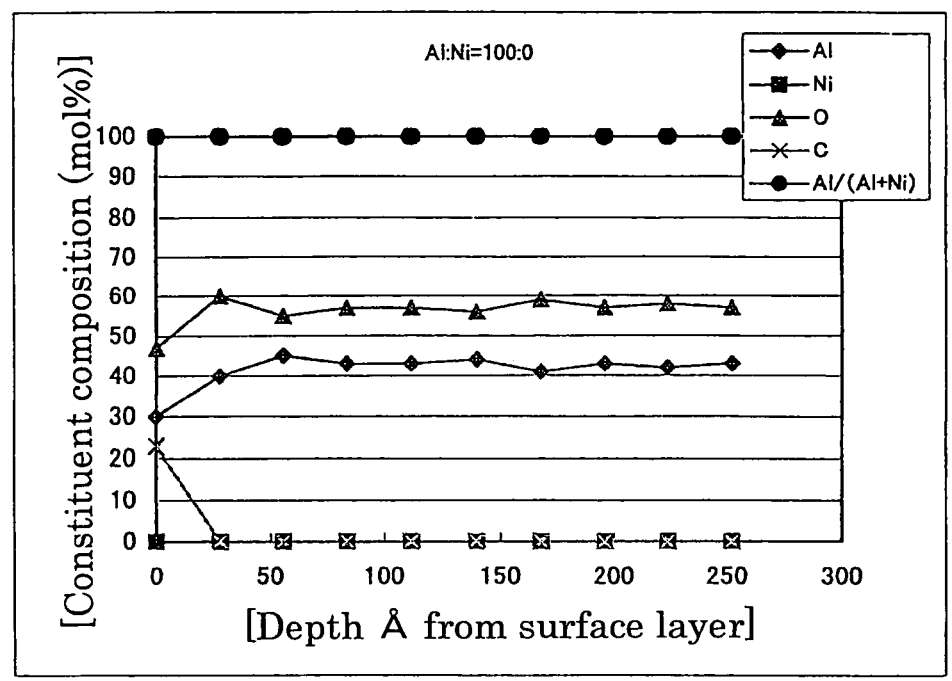
FIGS. 11(a) to 11(f) show analysis results of constituent composition of Stampers A1 to A6 used in Examples 2 to 7 of the present invention as determined with an X-ray electron spectroscopic instrument, FIG. 11(a), FIG. 11(b), FIG. 11(c), FIG. 11(d), FIG. 11(e) and FIG. 11(f) showing the analysis results of the constituent composition of Stampers A1, A2, A3, A4, A5 and A6, respectively.
Figure 11B:
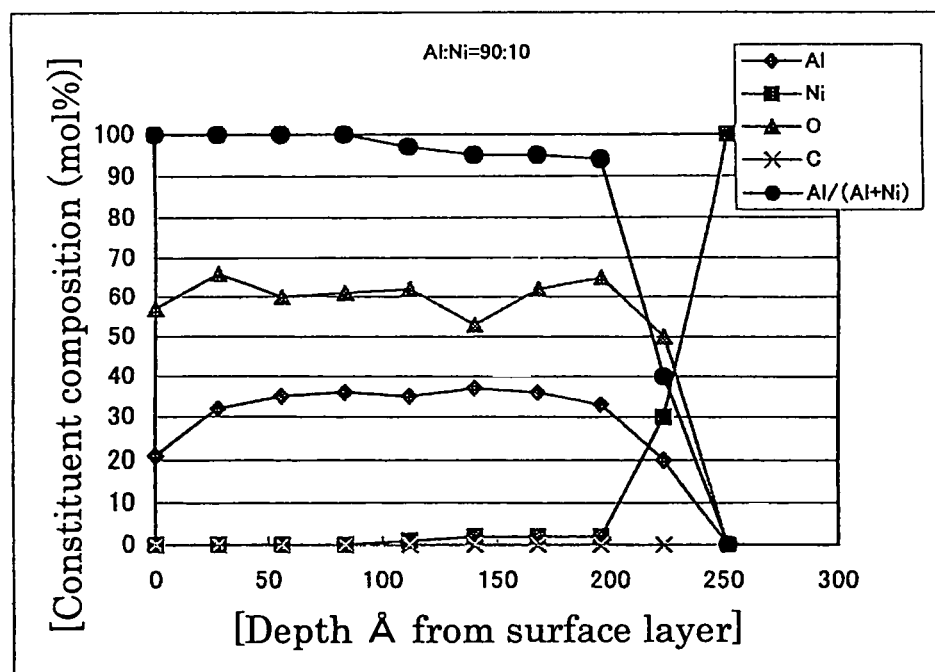
Figure 11C:
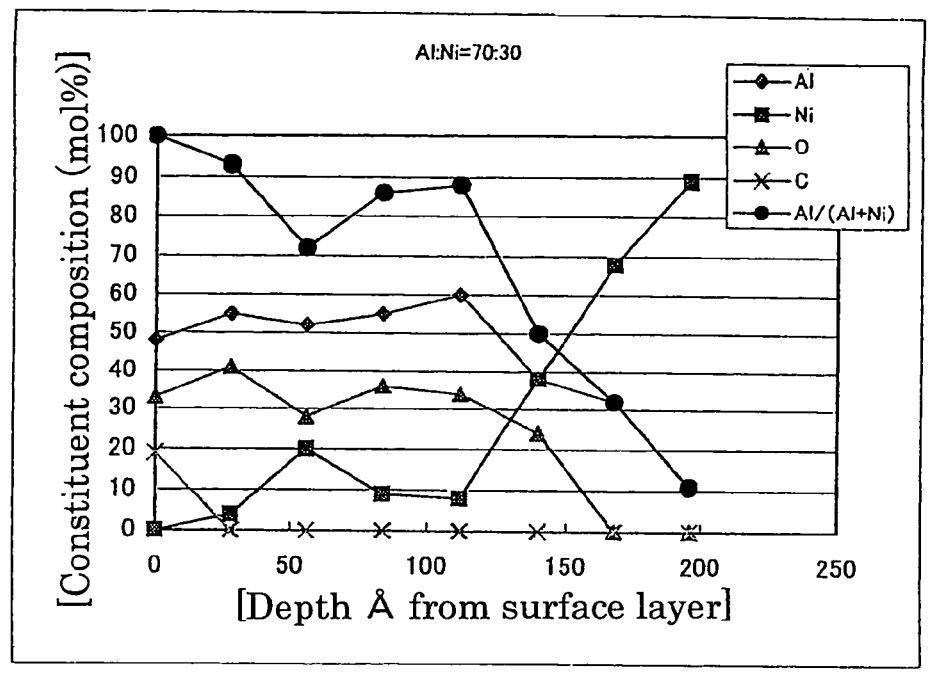
Figure 11D:
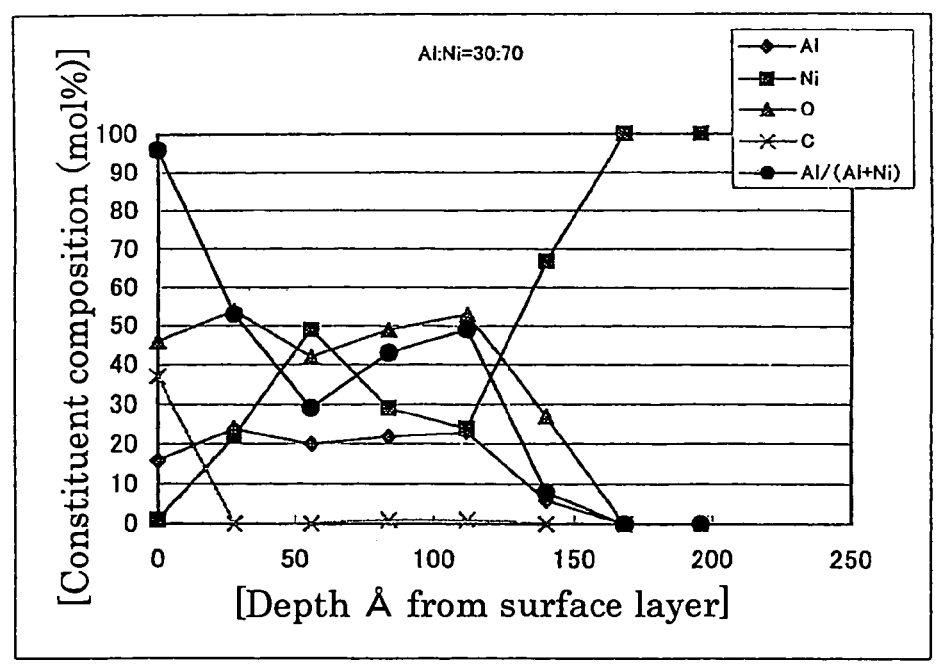
Figure 11E:
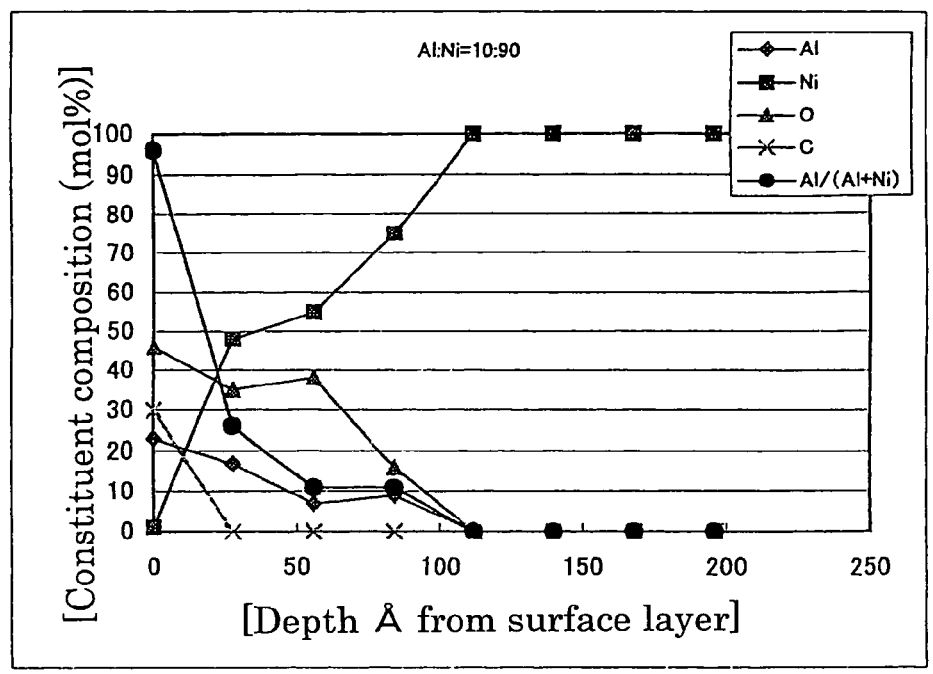
Figure 11F:
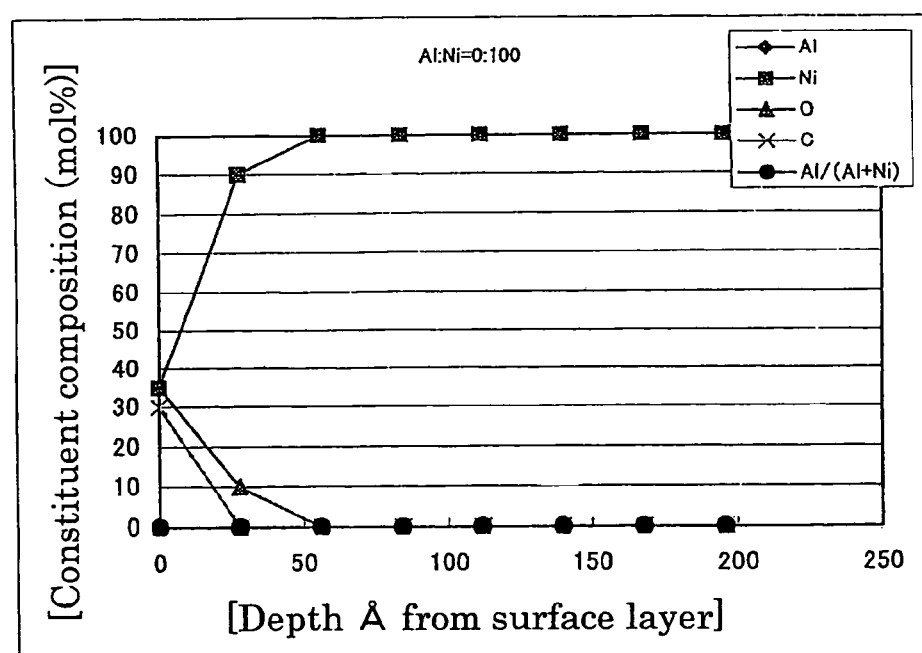

Stampers A-1 to A-6, stampers B-1 to B-6 and stampers C-1 to C-6 were obtained by the same procedure as in Example 1 except that an amount of aluminum remaining in the tungsten basket 13a and a set amount of nickel were appropriately adjusted and that the microstructure of the master plate to form the electroconductive film was changed. Compounding ratios (wt %) of evaporating materials to be used to produce the stamper are given in Table 3. Table 4 shows analysis results of the constituent composition of the stampers A1 to A6 obtained by using the X-ray electron spectroscopic instrument. The structure of the master plates used for producing the stampers B and C are shown in FIGS. 9 and 10. FIGS. 11(a) and 11(b) show analysis results of the constituent composition of the stampers A-1 to A-6 obtained by the X-ray electron spectroscopic instrument.

TABLE 3

| | Stamper-producing condition | | |
|---|---|---|---|
| | | Compounding ratio (wt %) of evaporated material | |
| | Kind of master | | |
| Stamper No. | plate | aluminum | nickel |
| A-1 | A | 100 | 0 |
| A-2 | A | 90 | 10 |
| A-3 | A | 70 | 30 |
| A-4 | A | 30 | 70 |
| A-5 | A | 10 | 90 |
| A-6 | A | 0 | 100 |
| B-1 | B | 100 | 0 |
| B-2 | B | 90 | 10 |
| B-3 | B | 70 | 30 |
| B-4 | B | 30 | 70 |
| B-5 | B | 10 | 90 |
| B-6 | B | 0 | 100 |
| C-1 | C | 100 | 0 |
| C-2 | C | 90 | 10 |
| C-3 | C | 70 | 30 |
| C-4 | C | 30 | 70 |
| C-5 | C | 10 | 90 |
| C-6 | C | 0 | 100 |

(A: Elongated elliptical pattern, B: elliptical dot pattern, C: prismatic pattern)

TABLE 4-1

Analysis values of stamper A-1

| Depth from front face layer | Constituent composition (mol %) of evaporated film | | | | |
|---|---|---|---|---|---|
| Å | Al(2p) | Ni(2p3/2) | O(1s) | C(1s) | Al/(Al + Ni) |
| 0 | 30 | 0 | 47 | 23 | 100 |
| 28 | 40 | 0 | 60 | 0 | 100 |
| 56 | 45 | 0 | 55 | 0 | 100 |
| 84 | 43 | 0 | 57 | 0 | 100 |
| 112 | 43 | 0 | 57 | 0 | 100 |
| 140 | 44 | 0 | 56 | 0 | 100 |
| 168 | 41 | 0 | 59 | 0 | 100 |
| 196 | 43 | 0 | 57 | 0 | 100 |
| | 42 | 0 | 58 | 0 | 100 |
| | 43 | 0 | 57 | 0 | 100 |

TABLE 4-2

Analysis values of stamper A-2

| Depth from front face layer | Constituent composition (mol %) of evaporated film | | | | |
|---|---|---|---|---|---|
| Å | Al(2p) | Ni(2p3/2) | O(1s) | C(1s) | Al/(Al + Ni) |
| 0 | 21 | 0 | 57 | 22 | 100 |
| 28 | 32 | 0 | 66 | 0 | 100 |
| 56 | 35 | 0 | 60 | 0 | 100 |
| 84 | 36 | 0 | 61 | 0 | 100 |
| 112 | 35 | 1 | 62 | 0 | 97 |
| 140 | 37 | 2 | 53 | 0 | 95 |
| 168 | 36 | 2 | 62 | 0 | 95 |
| 196 | 33 | 2 | 65 | 0 | 94 |
| 224 | 20 | 30 | 50 | 0 | 40 |
| 252 | 0 | 100 | 0 | 0 | 0 |

TABLE 4-3

Analysis values of stamper A-3

| Depth from front face layer Å | Constituent composition (mol %) of evaporated film | | | | |
|---|---|---|---|---|---|
| | Al(2p) | Ni(2p3/2) | O(1s) | C(1s) | Al/(Al + Ni) |
| 0 | 48 | 0 | 33 | 19 | 100 |
| 28 | 55 | 4 | 41 | 0 | 93 |
| 56 | 52 | 20 | 28 | 0 | 72 |
| 84 | 55 | 9 | 36 | 0 | 86 |
| 112 | 60 | 8 | 34 | 0 | 88 |
| 140 | 38 | 38 | 24 | 0 | 50 |
| 168 | 32 | 68 | 0 | 0 | 32 |
| 196 | 11 | 89 | 0 | 0 | 11 |

TABLE 4-4

Analysis values of stamper A-4

| Depth from front face layer Å | Constituent composition (mol %) of evaporated film | | | | |
|---|---|---|---|---|---|
| | Al(2p) | Ni(2p3/2) | O(1s) | C(1s) | Al/(Al + Ni) |
| 0 | 16 | 1 | 46 | 37 | 96 |
| 28 | 24 | 22 | 54 | 0 | 53 |
| 56 | 20 | 49 | 42 | 0 | 29 |
| 84 | 22 | 29 | 49 | 1 | 43 |
| 112 | 23 | 24 | 53 | 1 | 49 |
| 140 | 6 | 67 | 27 | 0 | 8 |
| 168 | 0 | 100 | 0 | 0 | 0 |
| 196 | 0 | 100 | 0 | 0 | 0 |

TABLE 4-5

Analysis values of stamper A-5

| Depth from front face layer Å | Constituent composition (mol %) of evaporated film | | | | |
|---|---|---|---|---|---|
| | Al(2p) | Ni(2p3/2) | O(1s) | C(1s) | Al/(Al + Ni) |
| 0 | 23 | 1 | 46 | 30 | 96 |
| 28 | 17 | 48 | 35 | 0 | 26 |
| 56 | 7 | 55 | 38 | 0 | 11 |
| 84 | 9 | 75 | 16 | 0 | 11 |
| 112 | 0 | 100 | 0 | 0 | 0 |
| 140 | 0 | 100 | 0 | 0 | 0 |
| 168 | 0 | 100 | 0 | 0 | 0 |
| 196 | 0 | 100 | 0 | 0 | 0 |

TABLE 4-6

Analysis values of stamper A-6

| Depth from front face layer Å | Constituent composition (mol %) of evaporated film | | | | |
|---|---|---|---|---|---|
| | Al(2p) | Ni(2p3/2) | O(1s) | C(1s) | Al/(Al + Ni) |
| 0 | 0 | 35 | 35 | 30 | 0 |
| 28 | 0 | 90 | 10 | 0 | 0 |
| 56 | 0 | 100 | 0 | 0 | 0 |
| 84 | 0 | 100 | 0 | 0 | 0 |
| 112 | 0 | 100 | 0 | 0 | 0 |
| 140 | 0 | 100 | 0 | 0 | 0 |
| 168 | 0 | 100 | 0 | 0 | 0 |
| 196 | 0 | 100 | 0 | 0 | 0 |

2. Injection Molding Tests

Injection molding tests were carried out by using a NADEM 5000 molding machine manufactured by Meiki Manufacturing Co., Ltd. (mold-clamping pressure: 500 T), a 370×300 mm planar mold (plane thickness 2 mm or 8 mm) in which the stamper could be placed, and a TZ-1500HM automatic takeout device manufactured by Star Seiki Co., Ltd.

(1) Examples 2-1 to 2-3

A stamper of A-type was fitted to a fixing side of the planar mold of 370×300 mm×8 mm, and a stamper of B-type was fitted to a movable side thereof. Injection molding was carried out by using PMMA ("PARAPET" GH-1000S manufactured by Kuraray Co., Ltd.), while the holding pressure was varied, and relationship between the holding pressure and the mold releasability was examined. The mold releasability was evaluated according to results on whether the molded product could be taken out by the automatic takeout device. The injection molding condition and test results are shown in Table 5. The molded products could be excellently taken out in the practical conditional range.

(2) Comparative Example 2-1

Tests were carried out in the same manner as in Examples 2-1 to 2-3 except that the stampers A-6 and B-6 were used, and the relationship between the holding pressure and the mold releasability was examined. The injection molding condition and test results are shown in Table 5. The molded products could not be taken out at the holding pressure of 45 MPa or more, so that good mold releasability could not be attained.

TABLE 5

Relationship between the holding pressure and whether the molded product could be taken out or not
Used material PMMA ("PARAPET" GH-1000S)

| | Kind of Stamper | | | | | | | |
|---|---|---|---|---|---|---|---|---|
| | Mold-fixed side | | | Mold-movable side | | | | |
| | | Constituent composition of evaporated material (wt %) | | | Constituent composition of evaporated material (wt %) | | Holding pressure(MPa) | | |
| Example | | Al | Ni | | Al | Ni | 40 | 45 | 50 |
| Example 2-1 | A-3 | 70 | 30 | B-3 | 70 | 30 | good | good | good |
| Example 2-2 | A-4 | 30 | 70 | B-4 | 30 | 70 | good | good | good |
| Example 2-3 | A-5 | 10 | 90 | B-5 | 10 | 90 | good | good | good |

TABLE 5-continued

Relationship between the holding pressure and whether the
molded product could be taken out or not
Used material PMMA ("PARAPET" GH-1000S)

| | Kind of Stamper | | | | | | | |
|---|---|---|---|---|---|---|---|---|
| | Mold-fixed side | | | Mold-movable side | | | | |
| | Constituent composition of evaporated material (wt %) | | | Constituent composition of evaporated material (wt %) | | Holding pressure(MPa) | | |
| Example | | Al | Ni | | Al | Ni | 40 | 45 | 50 |
| Comparative Example 2-1 | A-6 | 0 | 100 | B-6 | 0 | 100 | good | not good | not good |

Note 1:
Injection molding condition
Thickness of planar molded product: 8 mmt,
cylinder temperature: 265° C.,
mold temperature: 85° C.,
pressure-holding time period: 35 seconds,
cooling time period: 120 seconds,
filling time period: 9 seconds (3) Examples 3-1 to 3-3

A stamper of B-type was fitted to a fixing side of the planar mold of 370×300 mm×2 mm, and a stamper of C-type was fitted to a movable side thereof. Injection molding was carried out by using GH-1000S, while the holding pressure was varied, and the relationship between the holding pressure and the mold releasability was examined. The mold releasability was evaluated according to results on whether the molded product could be taken out by the automatic takeout device or not. The injection molding condition and test results are shown in Table 6. The molded products could be excellently taken out in the practical conditional range.

(4) Comparative Example 3-1

Tests were carried out in the same manner as in Examples 3-1 to 3-3 except that the stampers B-6 and C-6 were used, and the relationship between the holding pressure and the mold releasability was examined. The injection molding condition and test results are shown in Table 6. The molded products could not be taken out at the holding pressure of 20 MPa or more, so that good mold releasability could not be attained.

TABLE 6

Relationship between the holding pressure and whether
the molded product could be taken out or not
Used material PMMA ("PARAPET" GH-1000S)

| | Kind of Stamper | | | | | | | | |
|---|---|---|---|---|---|---|---|---|---|
| | Mold fixed side | | | | | | | | |
| | | Constituent composition of evaporated material (wt %) | | | Constituent composition of evaporated material (wt %) | | Holding pressure(MPa) | | |
| | | Al | Ni | | Al | Ni | 20 | 30 | 40 |
| Example 3-1 | B-3 | 70 | 30 | C-3 | 70 | 30 | good | good | good |
| Example 3-2 | B-4 | 30 | 70 | C-4 | 30 | 70 | good | good | good |
| Example 3-3 | B-5 | 10 | 90 | C-5 | 10 | 90 | good | good | not good |
| Comparative Example 3-1 | B-6 | 0 | 100 | C-6 | 0 | 100 | not good | not good | not good |

Note 1:
Injection molding condition
Thickness of planar molded product: 2 mmt,
cylinder temperature: 275° C.,
mold temperature: 85° C.,
pressure-holding time period: 9 seconds,
cooling time period: 90 seconds,
filling time period: 1.4 seconds

(5) Examples 4-1 to 4-3

A stamper of A-type was fitted to a fixing side of the planar mold of 370×300 mm×8 mm, and a stamper of B-type was fitted to a movable side thereof. Injection molding was carried out by using PMMA ("PARAPET" GH-1000S manufactured by Kuraray Co., Ltd), while the cooling time was varied, so the relationship between the cooling time period and the mold releasability was examined. The mold releasability was evaluated according to results on whether the molded product could be taken out by the automatic takeout device or not. The injection molding condition and test results are shown in Table 7. The molded product could be excellently taken out in the practical conditional range.

(6) Comparative Example 4-1

Tests were carried out in the same manner as in Examples 4-1 to 4-3 except that the stampers A-6 and B-6 were used, and the relationship between the cooling time period and the mold releasability was examined. The injection molding condition and test results are shown in Table 7. The molded products could not be taken out for a cooling time period of 85 second or less, so that good mold releasability could not be attained.

(7) Examples 5-1 to 5-3

A stamper of B-type was fitted to a fixing side of the planar mold of 370×300 mm×2 mm, and a stamper of C-type was fitted to a movable side thereof. Injection molding was carried out by using PMMA ("PARAPET" GH-1000S manufactured by Kuraray Co., Ltd.), while the cooling time period was varied. The relationship between the cooling time period and the mold releasability was examined. The mold releasability was evaluated through visual confirmation of the degree of a mold-released mark of the molded product. ⊡, O, □ and X denote "no mold-released mark", "slight mold-released mark", "mold-released mark" and "conspicuous mold-released mark", respectively. Test injection-molding condition and results are shown in Table 8. As compared with the following Comparative Example 5-1 in which a front face of the stamper was Ni alone, the stampers in Examples 5-1 to 5-3 hardly produced the mold-released mark, and exhibited good mold releasability.

(8) Comparative Example 5-1

Tests were carried out in the same manner as in Examples 5-1 to 5-3 except that the stampers B-6 and C-6 were used, and the relationship between the cooling time period and the mold releasability was examined. The injection molding condition and test results are shown in Table 8. A mold-released mark was produced for the cooling time period of 120 seconds or more, so that good mold releasability could not be attained.

TABLE 7

Relationship between the mold-cooling time period and whether the molded product could be taken out or not
Used material PMMA ("PARAPET" GH-1000S)

| | Kind of Stamper | | | | | | | | | |
|---|---|---|---|---|---|---|---|---|---|---|
| | Mold fixed side | | Mold-movable side | | | | | | | |
| | | Constituent composition of evaporated material (wt %) | | Constituent composition of evaporated material (wt %) | | Cooling Time (sec.) | | | | |
| | | Al | Ni | | Al | Ni | 100 | 90 | 85 | 80 |
| Example 4-1 | A-3 | 70 | 30 | B-3 | 70 | 30 | good | good | good | good |
| Example 4-2 | A-4 | 30 | 70 | B-4 | 30 | 70 | good | good | good | good |
| Example 4-3 | A-5 | 10 | 90 | B-5 | 10 | 90 | good | good | good | good |
| Comparative Example 4-1 | A-6 | 0 | 100 | B-6 | 0 | 100 | good | good | not good | not good |

Note 1:
Injection molding condition
Thickness of planar molded product: 8 mmt,
cylinder temperature: 265° C.,
mold temperature: 85° C.,
pressure-holding time period: 35 seconds,
holding pressure: 25 MPa,
filling time period 9 seconds.

TABLE 8

Relationship between the cooling time period and
whether the mold-released mark was formed or not

| | | Kind of Stamper | | | | | | | | | | |
|---|---|---|---|---|---|---|---|---|---|---|---|---|
| | | Mold fixed side | | | Mold-movable side | | | | | | | |
| | | Constituent composition of evaporated material (wt %) | | | Constituent composition of evaporated material (wt %) | | | Cooling time period (MPa) | | | | |
| | Used material | | Al | Ni | | Al | Ni | 160 | 150 | 140 | 130 | 120 |
| Example 5-1 | PARAPET GH-1000S | B-3 | 70 | 30 | C-3 | 70 | 30 | Δ | ○ | ⊙ | ⊙ | ⊙ |
| Example 5-2 | PARAPET GH-1000S | B-4 | 30 | 70 | C-4 | 30 | 70 | X | Δ | ○ | ⊙ | ⊙ |
| Example 5-3 | PARAPET GH-1000S | B-5 | 10 | 90 | C-5 | 10 | 90 | X | Δ | ○ | ○ | ⊙ |
| Example 6-1 | MS resin TX | B-3 | 70 | 30 | C-3 | 70 | 100 | X | ○ | ○ | ⊙ | ⊙ |
| Example 6-2 | MS resin TX | B-4 | 30 | 70 | C-4 | 30 | 100 | X | Δ | ○ | ⊙ | ⊙ |
| Comparative Example 5-1 | PARAPET GH-1000S | B-6 | 0 | 100 | C-6 | 0 | 100 | X | X | Δ | ○ | ○ |
| Comparative Example 6-1 | PARAPET GH-1000S | B-6 | 0 | 100 | C-6 | 0 | 100 | X | X | X | Δ | ○ |

Note
1) Injection molding condition
Thickness of planar molded product: 8 mmt,
cylinder temperature: 265° C.
mold temperature: 85° C.,
pressure-holding time period: 35 seconds,
holding pressure: 30 MPa,
filling time period: 9 seconds
2) ⊙: "no mold-released mark",
○ "slight mold-released mark",
Δ "mold-released mark",
and X "conspicuous mold-released mark"

(9) Examples 6-1 and 6-2

Examples 6-1 and 6-2 were tested in the same manner as in Examples 5-1 to 5-3 except that an MS resin TP-SX manufactured by Denki Kagaku Kogyou Co., Ltd. was used as the molding material in placed of PMMA ("PARAPET" GH-1000S manufactured by Kuraray Co., Ltd.). As compared with the following Comparative Example 6-1 in which a surface layer of the stamper was Ni alone, Examples 6-1 and 6-2 hardly produced the mold-released mark, and exhibited better mold releasability.

(10) Comparative Example 6-1

Comparative Example 6-1 was tested in the same manner as in Examples 6-1 and 6-2 except that the stampers B-6 and C-6 were used, and relationship between the cooling time period and the mold releasability was examined. Injection molding condition and test results are shown in Table 8. When the cooling time period was 120 seconds or more, a mold-released mark was produced and good mold releasability could not be attained.

3. Durability Test of Front Face Films of Stampers (1) Examples 7-1 to 7-4 and Comparative Examples 7-1 and 7-2

With respect to the Stampers A-1 to A-6, film adhesion to the stamper was visually examined when peeled from the photoresist. Light guides for the surface light source device were continuously molded at 1000 shots under the same condition, and durability of the films was evaluated. Results are shown in Table 9. Stampers A-1 and A-2 had low film adhesion in that the front face of the stamper looked macular as the aluminum layer was captured to a side of the photoresist when peeled from the photoresist. On the other hand, the aluminum layer was not captured by the photoresist in A-3 to A-6 when peeled from the photoresist. Observation of the front face of the light guide for the surface light source device after the continuous 1000 shot moldings could confirm no peeling of the film. As seen from analysis results up to a depth of 200 Å from the surface layer portion of the stampers shown in Tables 4-1 and 4-2, this is considered to be attributable to the fact that when a discontinuous layer exists in the surface layer portion or when the content of aluminum at the surface layer portion is extremely high, the film adhesion is poor. It is considered that since clear interface hardly exists in the film composition in which aluminum preferentially continuously decreases as shown in Tables 4-3 and 4-4, peeling does not occur inside the layer.

TABLE 9

Durability tests of front face films

| Stamper No. | Compounding ratio of evaporated material (wt %) Al | Compounding ratio of evaporated material (wt %) Ni | State of on peeling (for photo-resist) | Number of molding shots where film was peeled | Evaluation of film adhesion |
|---|---|---|---|---|---|
| Comparative Example 7-1 | A-1 | 100 | 0 | 90% of Al film peeled | not molded | X |
| Comparative Example 7-2 | A-2 | 90 | 10 | 50% of Al film peeled | not molded | X |
| Example 7-1 | A-3 | 70 | 30 | no film peeling | no film peeling after 1000 shots or more | ○ |
| Example 7-2 | A-4 | 30 | 70 | no film peeling | no film peeling after 1000 shots or more | ○ |
| Example 7-3 | A-5 | 10 | 90 | no film peeling | no film peeling after 1000 shots or more | ◉ |
| Example 7-4 | A-6 | 0 | 100 | no film peeling | no film peeling after 1000 shots or more | ◉ |

INDUSTRIAL APPLICABILITY

The resin-forming mold according to the present invention can be used for producing resin-molded products having finely uneven portions at the surface thereof, such as light guides for the surface light source devices of the liquid crystal displays, aspheric micro-lenses, micro-Fresnel lenses, optical discs, etc. The resin-forming mold exhibits high mold releasability to the molding resin and excellent durability. The method for producing the resin-forming mold does not increase the production cost. Therefore, the resin-forming mold and the production method therefor have large industrial applicability in this technical field.

What is claimed is:

1. A resin-forming mold comprising an electroformed layer, and an electroconductive film having a front face and a back face, on said electroformed layer, wherein said electroconductive film has uneven portions formed on said front face thereof and said electroformed layer is formed on said back face, wherein said front face is substantially formed of aluminum and said back face is formed of at least one electroconductive metal, wherein an intermediate portion of said electroconductive film from the front face to the back face comprises aluminum and said at least one electroconductive metal, and wherein a compounding ratio between said aluminum and said at least one electroconductive metal continuously changes from the front face toward the back face.

2. A resin-forming mold comprising an electroformed layer, and an electroconductive film having a front face and a back face, on said electroformed layer, wherein said electroconductive film has uneven portions formed on said front face thereof and said electroformed layer is formed on said back face, wherein said front face is substantially formed of aluminum and oxygen, and said back face is formed of at least one electroconductive metal, wherein an intermediate portion of said electroconductive film from the front face to the back face comprises aluminum and said at least one electroconductive metal, and wherein a compounding ratio between said aluminum and said at least one electroconductive metal continuously changes from the front face toward the back face.

3. The resin-forming mold set forth in claim 1 or 2, wherein the electroconductive film comprises the aluminum and the at least one electroconductive metal in a weight ratio of 70:30 to 10:90.

4. The resin-forming mold set forth in claim 1 or 2, wherein said electroconductive film is formed by vapor deposition.

5. The resin-forming mold set forth in claim 1 or 2, wherein a thickness of the electroconductive film is 200 to 3000 Å.

6. The resin-forming mold set forth in claim 1 or 2, wherein a ratio of the aluminum and the at least one electroconductive metal is 97.5:2.5 to 10:90 in terms of a molar ratio in a depth range of 10 to 100 Å from the front face of the electroconductive film.

7. The resin-forming mold set forth in claim 1 or 2, wherein the concentration of aluminum monotonically decreases beginning at a depth area of 110 Å or more from the front face of the electroconductive film.

8. The resin-forming mold set forth in claim 2, wherein at least part of the aluminum forms an oxide of aluminum through reacting with said oxygen.

9. The resin-forming mold set forth in claim 1 or 2, wherein the at least one electroconductive metal is nickel.

10. The resin-forming mold set forth in claim 1 or 2, wherein the electroformed layer is a nickel-electroformed layer formed of nickel.

11. A method for producing a resin-forming mold, comprising:

fitting aluminum to a heating heat generator inside a vacuum deposition apparatus, leaving a predetermined amount of the aluminum on the heat generator by partially evaporating away the aluminum fitted to the heating heat generator, fitting a master plate comprising a substrate and a photoresist film on the substrate to a substrate holder inside said vacuum deposition apparatus, said photoresist film being adapted to form a predetermined uneven pattern and fitting at least one electroconductive metal on said heating heat generator;

forming an electroconductive film on the photoresist film of the master plate by vacuum depositing the left aluminum and the at least one electroconductive metal on the heating heat generator;

forming an electroformed layer on the electroconductive film by electroforming at least one electroforming metal; and obtaining the resin-forming mold by removing the master plate from the electroconductive film.

12. The method for producing the resin-forming mold set forth in claim 11, wherein a weight ratio between the left aluminum and the fitted electroconductive metal is in a range of 90:10 to 10:90.

13. The method for producing the resin-forming mold set forth in claim 11, wherein a thickness of the electroconductive film is 200 to 3000 Å.

14. The method for producing the resin-forming mold set forth in claim 11, wherein the at least one electroconductive metal is nickel.

15. The method for producing the resin-forming mold set forth in claim 11, wherein the at least one electroforming metal is nickel.

* * * * *